Nov. 16, 1954 C. H. BABBS 2,694,352
POWER-DRIVEN LENS TURRET IN CAMERAS
Filed April 7, 1952 2 Sheets-Sheet 1

Inventor
CYRUS H. BABBS
By
Emery Holcombe Blair
Attorneys

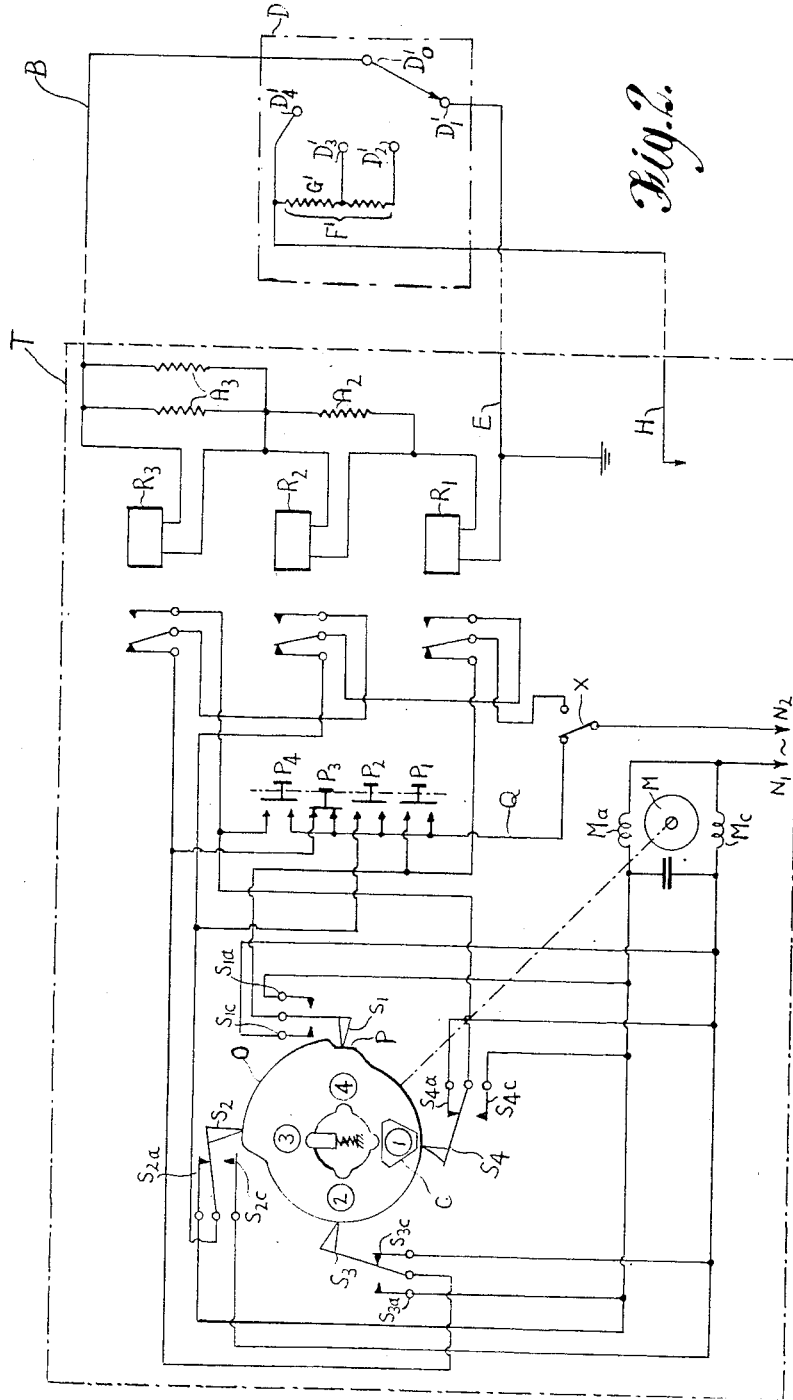

United States Patent Office 2,694,352
Patented Nov. 16, 1954

2,694,352

POWER-DRIVEN LENS TURRET IN CAMERAS

Cyrus Herbert Babbs, Cambridge, England, assignor to Pye Limited, Cambridge, England, a British company Application April 7, 1952, Serial No. 280,955

Claims priority, application Great Britain April 12, 1951

9 Claims. (Cl. 95—45)

The present invention relates to cameras, particularly television cameras, having a plurality of lenses mounted on a movable turret at the front of the camera, whereby the lenses may be selectively moved into an operative position, and has for an object to provide an arrangement for electrically selecting the turret position which preferably enables the turret to be remotely controlled with a minimum number of additional wires in the cable connecting the camera to the remote point.

For example, in the case of a television camera having a rotatable turret carrying a plurality of lenses which may be selectively moved into an operative position in alignment with the pick-up tube, it is sometimes desirable to effect the operation of the turret from a remote point.

According to the present invention, the turret is arranged to be driven by an electric motor, a plurality of turret-operated contacts being provided which are selectively operated in the different operative positions of the turret, the circuit controlling the motor (or for coupling and uncoupling the drive between the motor and turret) being selectively completed through one of said turret-operated contacts, the said circuit being opened when the turret reaches its selected operative position and actuates the selected turret-operated contact to stop the turret.

The existing cable between the camera and the camera control unit already contains a large number of leads and it is desirable that the additional control for the turret should be effected with the minimum number of additional leads. The cable already contains two leads supplying current between the camera and the control unit, for example the positive high tension and earth leads, and in order to enable the position of the turret to be selected from a remote point by employing only one additional wire in the cable, the selection of the turret-operated contacts in accordance with the lens required may, according to a feature of the invention, be arranged to be effected by the operation of voltage-selective relays across which different potentials may be applied by the selective operation of a switch. The operation of the switch may select different potentials between earth potential and the high tension voltage existing in the cable between the camera and the remote point so that only an extra wire is necessary in the cable for enabling remote control of the turret to be obtained.

A similar set of voltage-selective relays may be located at the remote point, for example in the camera control unit, for selectively operating indicators to indicate at the remote point the selected turret position. The switch for controlling the set or sets of relays may be located in the camera control unit or alternatively on the camera itself. Preferably two switches are provided, located respectively on the camera and the camera control unit, so that operation of the turret may be controlled either at the camera itself or from the remote point.

It is desirable that the turret should, when a lens has been selected, be rotated in clockwise and anti-clockwise direction, so as in each case to require a minimum of movement, and for this purpose, according to a further feature of the invention, the direction in which the turret is rotated is arranged to be selected automatically, according to the position of the required lens at the moment at which the selector switch is actuated.

For this purpose reversing contacts respectively associated with the different lenses or lens positions are arranged to be operated by the turret according to the momentary position of the associated lens in relation to the operative position.

Preferably the stopping and reversing contacts associated with each lens position are combined in a single contact device having two end positions respectively corresponding to clockwise and anti-clockwise rotation of the turret and a middle position in which the motor drive is inoperative.

These contact devices may be arranged around the turret corresponding to the arrangement of the lenses on the turret, and a single cam provided on the turret may operate all these contact devices in turn at each complete revolution of the turret.

In order that the invention may be more readily understood, two embodiments of the invention as applied to a television camera having a turret with four lenses, will now be described with reference to the accompanying drawings, in which:

Fig. 2 is a similar diagram of a modified embodiment.

Figure 1:
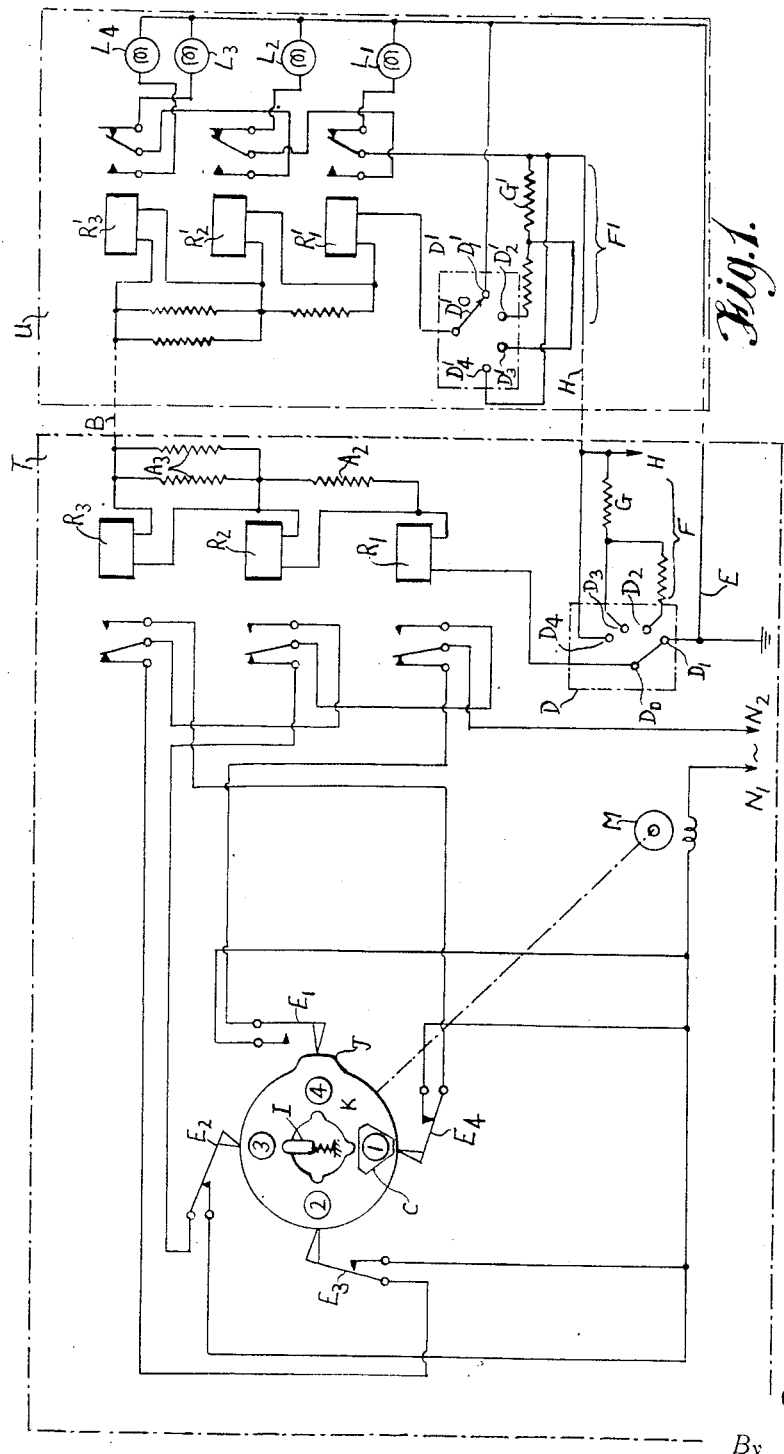
Fig. 1 is a diagram showing the circuit and apparatus of one embodiment.

Referring now first to Fig. 1, the camera housing T is provided at its front with a turret K carrying four lenses 1, 2, 3 and 4 and equipped with an indexing device I by which the turret is indexed when any one of the four lenses is in the operative position. This operative lens position is indicated at C, and each lens has associated with it a set of turret-operated switch contacts $E_1$, $E_2$, $E_3$ or $E_4$, while a cam J on the turret is arranged to open each set of contacts when the corresponding lens is in the operative position. A set of three relays $R_1$, $R_2$, $R_3$ which will respond at different voltages, as indicated by the shunt resistors A2 and A3, is also arranged in the camera and connected in series with a control conductor B which forms part of a cable connecting the camera T to the camera control unit U. A second set of three similar voltage-selective relays $R_1'$, $R_2'$, $R_3'$, is connected in series with the conductor B in the remote camera control unit. Opposite ends of the conductor B are respectively connected to the movable arms $D_0$ and $D_0'$ of two switches D and D' each having four positions defined by four contacts $D_1$ to $D_4$ or $D_1'$ to $D_4'$ over which the movable arm moves. The outer contacts $D_4$ and $D_1$ are connected respectively to the high tension and earth leads H and E which also form part of the cable extending between the camera and the camera control unit, whilst the two intermediate contacts $D_2$ and $D_3$ are connected to the high tension supply through resistors F, G of different values. The resistors F and G are so selected that as the movable arm $D_0$ is shifted from contact to contact, the requisite voltages are produced for selectively operating the relays $R_1$, $R_2$ and $R_3$ and $R_1'$, $R_2'$ and $R_3'$.

Thus, if the movable arm of switch D is connected to its earth contact $D_1$, the relays may be selectively operated by moving the arm $D_0'$ of the other switch D' over its associated contacts $D_1'$ to $D_4'$. When the second switch arm $D_0'$ is on its first or earth contact $D_1'$, all the relays are de-energised as shown. When the arm is moved to the next contact $D_2'$, one relay of each set ($R_1$ and $R_1'$) is energised; when arm $D_0'$ is moved to its third contact $D_3'$, two relays of each set ($R_1$, $R_2$ and $R_1'$, $R_2'$) will be energised; and when the arm is moved to its fourth contact $D_4'$, all relays of each set will be energised. In this way four conditions may be selectively established in each set of relays, and it will be obvious that the same conditions may alternatively be established by movement of switch D in the camera if the arm $D_0'$ of the switch D' in the control unit is kept on contact $D_1'$. The set of relays $R_1$ to $R_3$ in the camera enable the turret motor M to be energised through any one of four channels as will be described further on, while the set of relays $R_1'$ to $R_3'$ at the camera control unit selectively actuate corresponding light signals $L_1$ to $L_4$ or equivalent indicating means for indicating the selected turret position.

As illustrated, lens 1 is in the operative position, and contact set $E_1$ is accordingly shown open. We will, however, assume for the following consideration that the turret has been moved to a different position, and that contact $E_1$ is therefore closed. It will be seen that both switch arms $D_0$ and $D_0'$ are on their first contact $D_1$ and $D_1'$ respectively, and all the relays are therefore shown deenergised. As a result (assuming contact $E_1$ closed), a circuit is established from mains terminal $N_1$ through motor M, contact $E_1$, and left-hand and centre contacts of $R_1$ to mains terminal $N_2$. The motor will therefore turn the turret until lens 1 reaches the operative position C, when cam J will open contact $E_1$ as shown, thus stopping the motor. At the control station indicator lamp $L_1$ will be energised through a circuit from H through right-hand and centre contacts of $R_1'$ and lamp $L_1$ to E, while the indicator lamps $L_2$ to $L_4$ are extinguished, their circuits being interrupted at the left-hand contact of $R_1'$.

Assuming now for example that lens $L_3$ is required and for this reason switch D in the camera is moved to contact $D_3$. This will cause a voltage to be applied to the series-connected relays corresponding to the total voltage H to E reduced by a relatively small voltage drop across resistance G, and accordingly relays $R_1$, $R_2$, $R_1'$ and $R_2'$ will move to their energised positions, the voltage being, however, insufficient to operate relays $R_3$ and $R_3'$. It will be seen that motor M thus becomes energised through a circuit including terminal $N_1$, motor M, right-hand and centre contacts of relays $R_1$ and $R_2$, the left-hand and centre contacts of relay $R_3$, and contact set $E_3$. The turret will thus be rotated until, upon lens 3 reaching position $C_1$, contactor $E_3$ is opened, thus breaking the motor circuit. It will also be seen that the energisation of relays $R_1'$ and $R_2'$ at the control unit will cause lamp $L_1$ to become extinguished and lamp $L_3$ to become illuminated by means of a circuit which will be readily ascertained, thus indicating that although switch D' is in the position corresponding to lens 1, lens 3 has nevertheless been selected by operation of switch D at the camera.

It will now be understood without plotting in detail the circuits involved, that similarly the selection of lens 2 or 4 by either switch D or switch D' (with the other switch remaining on its first (earth) contact) will cause the selected lens to be moved to and stopped at the operative position C.

With the arrangement described, the turret motor always rotates in the same direction. It will be appreciated, however, that if there are four lenses on the turret, the turret will only move through one position when going from the first lens to the second lens but through three positions when moving from the second lens to the first lens.

Fig. 2 illustrates a modified circuit by which the time taken to move the turret to the next preceding position (considering normal direction of rotation of the turret) is reduced by reversing the direction of movement of the turret when the lens selected is that immediately preceding (with the normal direction of rotation of the turret) the lens in the operative position.

In order to carry this feature of the invention into effect, a turret-operated contact device $S_1$, $S_2$, $S_3$, $S_4$ is provided for each lens on the turret, each contact device S having a movable contact adapted to engage selectively one or the other of two stationary contacts $S_c$ and $S_a$ for causing the motor drive to operate in the clockwise or anti-clockwise direction respectively, and the turret is equipped with a cam O adapted so to control the position of each switch in accordance with the momentary position of the turret K as to cause the turret in each case to rotate in such direction that the desired lens reaches the operative position in not more than half a revolution. Preferably the switches S are also utilised for stopping the turret drive when the selected lens reaches the operative position; for this purpose the cam O is extended at one end by a cam portion P of lower height which when in engagement with the movable member of a contact device, causes the latter to assume an intermediate position (illustrated in the case of $S_1$) in which it does not engage either of the fixed contacts $S_c$ and $S_a$.

In the illustrated embodiment a turret motor M having two windings $M_c$ and $M_a$ is employed, energisation of windings $M_c$ and $M_a$ causing the motor to rotate for clockwise and anti-clockwise movement of the turret respectively.

It will be appreciated that the principal arrangement by which the turret, upon the operation of a selector element, is caused to rotate until the selected position is reached and then automatically come to a stop, is independent of the use of electrical relays, and accordingly in the embodiment of Fig. 2 alternative manually operable control means are illustrated in addition to the control relays $R_1$ to $R_3$. As shown, the manually operable control means comprise four selector push buttons $P_1$, $P_2$, $P_3$ and $P_4$, one for each lens on the turret, these push buttons being interlocked in a manner well known in connection with, for example, desk telephone sets, so that any button once pressed normally remains in its depressed condition but automatically returns to its normal position when any other button is pressed. Each button is arranged when depressed to connect a common lead Q to the centre contact of the switch S associated with the selected lens. A change-over switch X is further provided for selectively connecting mains terminal $N_2$ to the centre contact of relay $R_1$ when the turret is to be controlled from the switch D' in the remote camera control unit or to conductor Q when the local push-buttons $P_1$ to $P_4$ are to be used for controlling the turret.

As shown in Fig. 2, switch X is in the position establishing the latter connection, and push button $P_3$ has been pressed corresponding to the selection of lens 3. A circuit is thus completed from mains terminal $N_1$, through motor winding $M_c$, movable contact and contact $S_{3c}$ of contact device $S_3$, contact device $P_3$ and left-hand contact of switch X to the second mains terminal $N_2$. As a consequence the motor will turn the turret in a clockwise direction until on arrival of lens 3 in position C cam extension P moves contact device $S_3$ to the neutral position (as illustrated in the case of $S_1$) thereby stopping the motor.

Assuming now, that lens 2 instead of lens 3 had been selected, and that accordingly button $P_2$ had been pushed, motor winding $M_a$ would have been energised, instead of winding $M_c$, through a circuit including $N_1$, movable contact and contact $S_{2a}$ of contact device $S_2$ (due to action of cam O) push button contacts $P_2$, and left-hand contacts of X to $N_2$. As a consequence the turret would be rotated anti-clockwise until, on lens 2 reaching position C, cam extension P instead of cam O would act on $S_2$, thus stopping the motor.

When switch X is in the position as illustrated, the contacts of relays $R_1$ to $R_3$ are cut off from terminal $N_2$, so as to prevent any interference with the selection by one or another of these relays becoming energised. When on the other hand switch X is reversed, push buttons $P_1$ to $P_4$ similarly become inoperative, and the selection of the contact devices $S_1$ to $S_4$ is effected through selector switch D' and relays $R_1$ to $R_3$, similarly as described with reference to Fig. 1.

Whilst two embodiments have been described, it will be understood that various modifications may be made without departing from the scope of the invention. Thus, for example, the individual features of Figs. 1 and 2 may be variously combined, or by increasing the number of voltage-selective relays and/or selector buttons, the arrangement may be used for controlling a turret with more than four lenses. The remote-control will still require only one extra wire between the camera and the camera control unit if the additional relays have their contacts connected similarly to those of relay $R_2$.

Cam O if provided, should in each case be of such length as to engage, when one contact device S is engaged by cam extension P, all contact devices S lying on one side of a line extending from this contact device diametrically across the turret.

I claim:

1. In a television camera the combination of a rotatable turret at the front of the camera, having a plurality of operative positions, a cam carried by the turret for rotation therewith, a reversible power drive for rotating the turret, a plurality of selectively energisable control circuits for said drive, a plurality of contact devices respectively included in said control circuits, said devices being mounted in the camera for co-operation with said cam to break said circuits when the turret is in its different operative positions respectively, further contact devices operable for respectively modifying each said circuit to reverse the direction of the drive, and a further cam, likewise carried by and movable with the turret, for operating each said further contact device both when the turret passes across the operative position at which the circuit associated therewith is broken by the action of said first-mentioned cam and when the turret passes across a predetermined second position further removed from said operative position than the next adjacent operative position.

2. In a television camera the combination of a rotatable turret at the front of the camera, having a plurality of operative positions, a cam carried by the turret for rotation therewith, a reversible power drive for rotating the turret, a plurality of selectively energisable control circuits for said drive, a plurality of contact devices respectively included in said control circuits, said devices being mounted in the camera for co-operation with said cam to break said circuits when the turret is in its different operative positions respectively, and a further cam, likewise carried by and movable with the turret, for co-operation with said contact devices for modifying each said circuit to reverse the direction of the drive both when the turret passes across the operative position at which said circuit is broken by the action of said first-mentioned cam and when the turret passes across a predetermined second position further removed from said operative position than the next adjacent operative position.

3. A camera comprising a camera housing, a lens-carrying turret mounted at the front of said housing for rotary movement and having a plurality of operative positions, a reversible power drive for said turret, a plurality of contact devices respectively associated with the different operative positions of the turret, electrical control means for the turret drive, said control means including a plurality of pairs of control circuits for the drive, each pair of circuits including one circuit each for controlling clockwise and anti-clockwise movement of the turret respectively and the circuits of each pair including contacts of a different one of said contact devices, and turret-position selector means for selectively rendering operative the pair of circuits including the contact device associated with the selected operative position of the turret, contact means in each said contact device for selectively closing each circuit and for breaking both said circuits, means on the turret for selectively operating each said contact device to break both circuits when the turret is in the associated operative position, and means on the turret for operating each said contact device to close, when the turret is displaced from the associated operative position, that one of the two circuits which produces turret rotation in the direction required for reaching said operative position in not more than one half of a revolution.

4. A camera as claimed in claim 3, in which said turret-position selector means includes a plurality of differentially voltage-responsive relays for selectively establishing, according to the voltage applied, different circuit connections, each including a different one of said contact devices, for controlling said drive, and voltage-selector switch means for selectively applying to said relays voltages according to the lens selected.

5. A camera as claimed in claim 3, in which said turret-position selector means includes a plurality of differentially voltage-responsive relays for selectively establishing, according to the voltage applied, different circuit connections, each including a different one of said contact devices, for controlling said drive, and voltage-control means for selectively applying to said relays different voltages according to the lens selected, a camera control station remote from the camera, a multiple cable connection between the camera and control station including a pair of leads for respectively carrying two electric potentials having a predetermined potential difference and a third lead connected to said relays, said voltage control device being arranged at said control station and comprising means for selectively applying to said third lead a plurality of potentials between the said two potentials.

6. A camera as claimed in claim 3, wherein said turret-position selector means includes a plurality of press-button switch devices respectively associated with each said contact device and lens and interlocking means operable by each press-button switch device for rendering the remaining press-button switch devices inoperative.

7. A camera as claimed in claim 6, wherein said turret-position selector means further includes a plurality of electric relays, contacts operable by said relays for selectively energising each said pair of circuits, control means at a point remote from the camera for selectively energising said relays, and a changeover switch device having one position for rendering said press-button switches operative and the contacts of said relays inoperative and another position for rendering said press-button switches inoperative and said relay contacts operative to select one of said pairs of circuits.

8. In a television camera having a rotatable turret carrying at least three lenses each of which can, by rotation of the turret, be selectively moved into an operative position relative to a pick-up tube in the camera, the combination of a reversible electric motor operatively connected to rotate the turret, a plurality of three-position control switches one for each lens, each control switch in its first position preparing a circuit for driving said motor in one direction, in its second position interrupting the circuit to said motor and in its third position preparing a circuit for driving said motor in its other direction, a source of electric current, a plurality of selector switches for selectively connecting the source of electric current to said control switches thereby selectively to supply electric current to said motor through the corresponding control switch except when the latter is in its second position, and cam means rotatable with the turret and cooperatively associated with the control switches selectively to actuate the latter to set the control switch associated with a lens in the operative position in its second position, to set the control switch associated with the lens next adjacent in one direction to the lens in the operative position in its first position, and to set the control switch associated with the lens next adjacent in the other direction to the lens in the operative position in its third position.

9. An arrangement as claimed in claim 8, in which each control switch has a single movable contact and two fixed contacts respectively engaged by said movable contact in said first and third positions, the movable contact when in its second position being disengaged from both said fixed contacts, said motor having two energising windings one for each direction of rotation, one end of each winding being connected to the source of electric current and the opposite ends of said windings being connected respectively to the two fixed contacts of each control switch, and the movable contact of each control switch being connected to the source of electric current through its associated selector switch.

References Cited in the file of this patent
UNITED STATES PATENTS

| Number | Name | Date |
|---|---|---|
| 2,393,407 | Peterson | Jan. 22, 1946 |
| 2,393,408 | Peterson | Jan. 22, 1946 |